Jan. 2, 1934.  E. J. W. RAGSDALE  1,942,148
AIRCRAFT WING STRUCTURE
Filed May 31, 1930
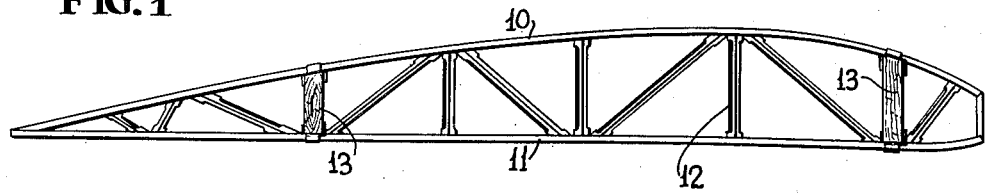
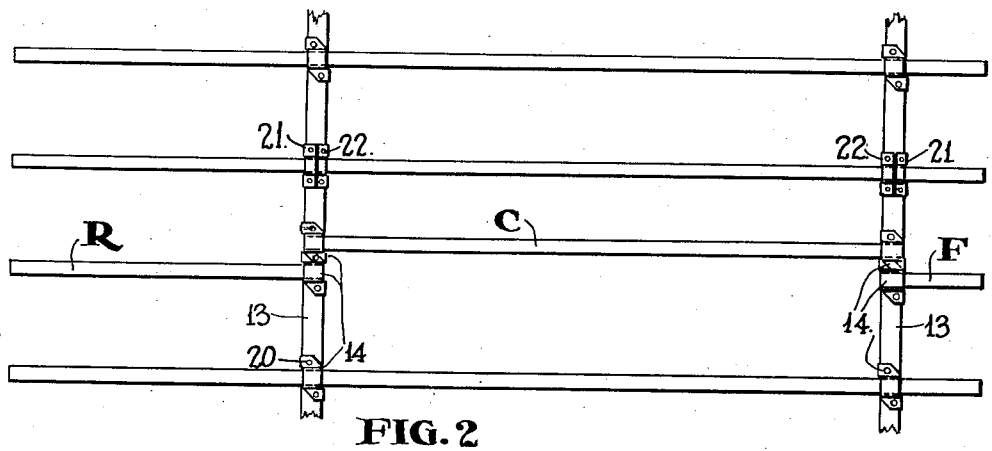
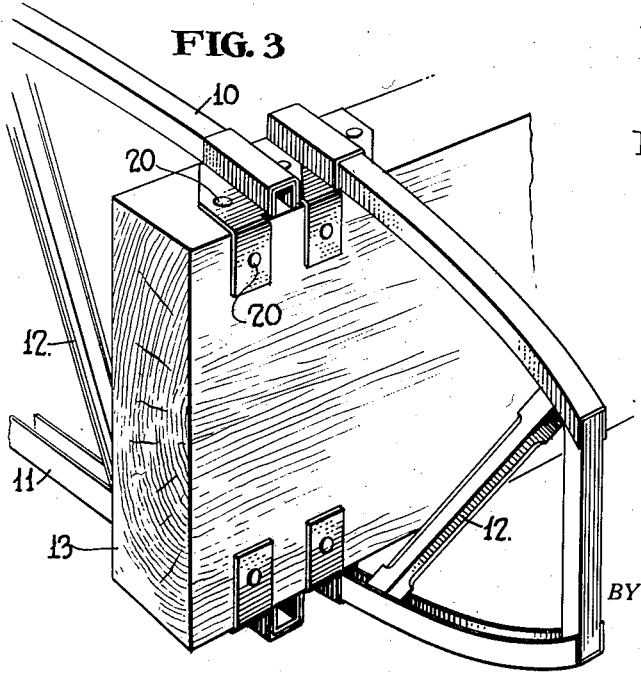
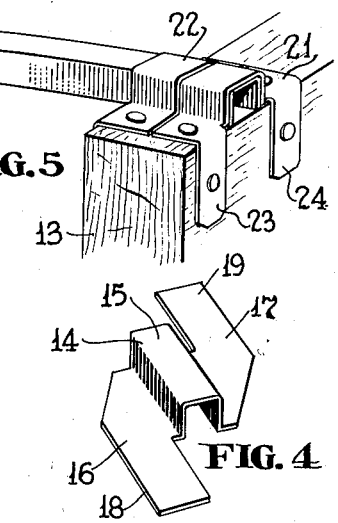
INVENTOR.
EARL J. W. RAGSDALE.
BY
ATTORNEY.

Patented Jan. 2, 1934

1,942,148

UNITED STATES PATENT OFFICE 1,942,148

AIRCRAFT WING STRUCTURE

Earl J. W. Ragsdale, Norristown, Pa., assignor to Edward G. Budd Manufacturing Company, Philadelphia, Pa., a corporation of Pennsylvania Application May 31, 1930. Serial No. 458,340

5 Claims. (Cl. 244—31)

The invention relates to aircraft wing structure and particularly to the construction and manner of attachment of built up trussed metal ribs to the spars.

It is a main object of my invention to provide a trussed metal rib and a manner of attachment of it to the wing spar, which securely holds the rib to the spar, yet is most simple and economical of construction, and which permits the ready repair of a rib in case of damage without removing an entire rib and its replacement with a new one.

In the accompanying drawing I have shown one embodiment of my invention whereby this object is attained in high degree.

In the drawing,

Fig. 1 is a side elevation of a rib according to the invention, the spars being shown in section.

Fig. 2 is a plan view of a section of the wing framing showing a bank of four ribs secured to the spars.

Fig. 3 is an enlarged view of a repaired rib and the relation between the repair part and the part of the old rib.

Fig. 4 is a detail perspective view of an attaching clip which is used in a preferred form of the invention.

Fig. 5 is a detail of another form of attachment of the rib to the spar.

In the drawing, I have shown a light sheet metal rib construction similar generally to that shown in my application Serial No. 456,993 filed May 29, 1930, in which the chords 10 and 11 are of channel section, the channels facing toward each other, and they are connected by generally Z section web members 12 spot welded to the side walls of the channels. The web members 12 are spaced apart adjacent the front and rear portions of the rib to receive the spars 13 between the chords.

In the present instance, these spars are shown to be wooden spars, but my invention is not to be construed as limited to the use of wooden spars, since metal spars could be used if desired. My invention contemplates the attachment of the ribs to the spars by means which is very simple to construct, yet forms a very strong connection, and adapts the rib for easy repair in case of damage to a part thereof, without necessitating the removal of a large part of the wing covering, and with a resulting repaired rib which is practically as strong and as securely anchored to the spar as the original rib.

In the preferred form of my invention, I provide a simple sheet metal stamping 14 which before attachment to the rib and spar is of the form shown in Fig. 4.

It consists of a central channel-shaped portion 15 adapted to fit over the channel section chord and to be strongly secured thereto as by spot welding the overlapped walls of the stamping and chord. From the side walls of the central portion extend two wings 16 and 17, the opposite ends of which are formed with extensions 18 and 19 beyond the ends of the central channel section portion 15.

When the ribs are applied to the spars the wings 16 and 17 lie flat against the end faces of the spars and may be secured thereto by suitable securing means such as the nails 20. The extensions 18 and 19 are turned down at an angle to the main body of the wings 16 and 17 and secured to the sides of the spars. This provides an attachment of the rib to the spar which is symmetrical with respect to the longitudinal central vertical plane of the spar 14. The manner of attaching of the stampings to the spars may, of course, vary with the nature of the spars.

The corners of the wings 16 and 17 remote from the extensions 18 and 19 may be cut away to lighten the attaching stamping without materially decreasing their strength.

In Fig. 2, I have indicated the manner in which an intermediate rib can be repaired in the event the central portion thereof between the spars has become damaged and needs replacement. In such event, the damaged portion is cut away by cutting off the chords close to the spars and another complete spar, of which a number should always be kept in stock by the user, is cut, so as to provide a central piece C extending from the outer side wall of the front spar to the outer side wall of the rear spar, and this part can then be attached to the spars immediately adjacent to the front and rear portions of the original rib by attaching stampings 14 exactly in the same manner as in the attachment of a new rib. The repaired rib, it will thus be seen, produces as strong a structure as the original rib which it replaces. Similar repair could be made if the front or rear portion F or R of the original rib were damaged, and without disturbing the wing cover to any great extent, probably no more than it was already disturbed by the accident which occasioned the damage of the rib.

It will be understood that repair parts according to the front, rear and central section of the rib might be kept in stock if desired, thus avoiding the necessity of cutting an entire rib for repairs.

In Fig. 5 and in the next to the top rib of Fig. 2, I have shown another form of attaching means for the rib which equally facilitates the repair of the rib, and permits the longitudinal aligned securement of the rib sections of the repaired rib to the spars.

In this modification, I provide two attaching stampings 21 and 22 each secured to the rib and the spar in a manner similar to the attachment of stamping 14 these stampings being symmetrically arranged on opposite sides of the central vertical longitudinal plane of the spar and each having two turned down extensions 23 and 24 secured to the side wall of the spar adjacent thereto, the extensions being on opposite sides of the rib. When it is desired to remove a portion of the rib for replacement by another, all that is necessary is to cut the chords between the two attaching stampings and detach the connection to the spar. A new section can then be readily attached in place of the removed section to form a complete rib, each section of which is independently secured to the spars, but with all the sections in the same vertical plane.

From the foregoing description, it will be seen that I have provided a very strong and simple method of attachment of the ribs to the spars and one which greatly facilitates the repair of a damaged rib. It will be understood that changes and modifications may be made from the precise structure shown and described by those skilled in the art, and I intend to include all such within the scope and spirit of the following claims.

What I claim is:

1. A device for attaching metal trussed aircraft ribs having continuous chords to spars comprising a pair of sheet metal members each having a portion embracing a chord of the rib and secured thereto and continuous lateral wings of a longitudinal extent greater than said chord embracing portion and adapted to overlap at least two faces of a spar, the said members being arranged symmetrically on opposite sides of the central vertical planes of the spar, and secured to said spar in said overlaps.

2. A device for attaching metal trussed aircraft ribs having continuous chords to spars comprising a pair of sheet metal members each having a portion embracing a chord of the rib and secured thereto, and continuous lateral wings of a longitudinal extent greater than said chord embracing portion and adapted to overlap at least two faces of a spar, the said members being arranged symmetrically on opposite sides of a transverse vertical plane of the spar and secured to said spar in said overlaps.

3. A device for attaching metal trussed aircraft ribs having continuous chords to spars comprising a sheet metal member having a central channel shaped portion for embracing a chord of the rib, and wings extending laterally from the sides of said central portion, said wings extending substantially beyond one end of said central portion in longitudinal parallelism.

4. A device for attaching metal trussed aircraft ribs having continuous chords to spars, comprising a sheet metal member having a central channel shaped portion substantially as long as the width of a spar for embracing a chord of the rib, a wing projecting laterally from each side wall of said central portion, an extension on each of said wings extending beyond the opposite ends of said central channel portion, said wings having a diagonal end opposite the end bearing said extension, said diagonal extending generally from the channel side of said wing toward the opposite side thereof in the direction of said extension.

5. A device for attaching metal trussed aircraft ribs to spars, comprising a sheet metal member having a central portion of substantially the width of a spar and shaped to embrace a chord of the rib and secured thereto, and continuous wing portions extending laterally from said central portion and beyond said central portion in the direction of its length, said wing portions being shaped to overlap the spar in at least two planes and secured thereto.

EARL J. W. RAGSDALE.